United States Patent [19]

Toyama

[11] Patent Number: 4,518,242
[45] Date of Patent: May 21, 1985

[54] AUTOMATIC FOCUS ADJUSTING DEVICE

[75] Inventor: Masamichi Toyama, Tokyo, Japan

[73] Assignee: Canon Kabushiki Kaisha, Tokyo, Japan

[21] Appl. No.: 650,305

[22] Filed: Sep. 12, 1984

[30] Foreign Application Priority Data

Sep. 13, 1983 [JP] Japan .................. 58-170386

[51] Int. Cl.³ .............................. G03B 3/00
[52] U.S. Cl. .................................. 354/403
[58] Field of Search ............... 354/400, 401, 402, 403, 354/195.1

[56] References Cited

U.S. PATENT DOCUMENTS 4,423,936  1/1984  Johnson ............... 354/403

FOREIGN PATENT DOCUMENTS 54-9054    4/1979  Japan .................. 354/403
55-111929  8/1980  Japan .................. 354/403

Primary Examiner—Russell E. Adams
Attorney, Agent, or Firm—Toren, McGeady, Stanger Goldberg & Kiel

[57] ABSTRACT

The disclosed automatic focus adjusting device has a first distance measuring circuit of the active type and a second distance measuring circuit of the passive type. Based on output signals from the distance measuring circuits, a focusing lens is driven by either the first or second distance measuring circuits. When switching between distance measuring circuits to obtain a change in output signals from the distance measuring circuits, the system makes the selected measuring circuit continue operating until the output signal exceeds a prescribed range of values.

2 Claims, 9 Drawing Figures

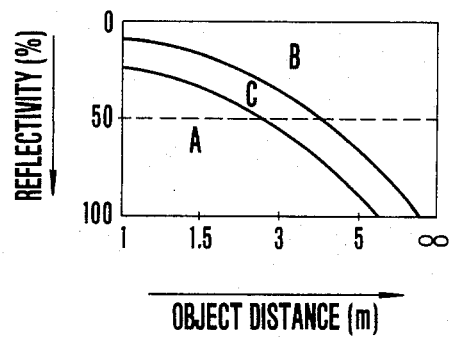
FIG.2
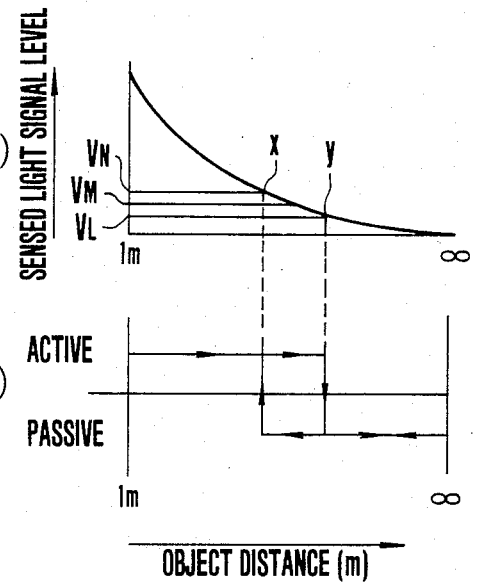
FIG.3(a)
FIG.3(b)

AUTOMATIC FOCUS ADJUSTING DEVICE

BACKGROUND OF THE INVENTION

1. Field of the Invention

This invention relates to automatic focus adjusting devices for still cameras, cine cameras and video cameras, and more particularly to automatic focus adjusting devices of the hybrid type having both a range finder of the active type in which a supersonic wave or an infrared light beam is projected onto an object to be photographed and its reflection is received to measure the object distance and another range finder of the passive type in which light coming from the object is received to measure the object distance.

2. Description of the Prior Art

A range finder of the active type is able to respond to objects of low brightness. Additionally, because the SN ratio of its signal becomes higher at shorter object distances, where the depth of field is shallow, the active type range finder generally has a high degree of accuracy. There are very few objects whose distances are impossible to measure with an active type range finder. However, there are limitations in the ability of active range finders to measure objects at far away distances for objects of law reflectivity and because the projected energy of an active range finder cannot be increased as much as desired. Additionally, the amount of electrical energy consumed is large.

Conversely, the passive type range finder is not limited by object distance or object reflectivity and consumes only a small amount of electrical power. However, it is almost impossible for the passive range finder to measure the distance to dim objects. Even where possible, the measurement takes a long time, e.g., half a second. Accordingly, there is a response gap in measuring distance, especially for moving objects. Moreover, the system becomes complicated because image processing of the object is also carried out. Finally, because of low contrast patterns, the passive range finder encounters a larger number of situations than the active range finder where it is impossible to measure object distance.

SUMMARY OF THE INVENTION

A first object of the present invention is to provide a device for adjusting the position of a focusing lens by the output of either one of a first distance measuring circuit of the active type and a second distance measuring circuit of the passive type, depending on the conditions of an object to be photographed.

A second object of the present invention is to provide an automatic focus adjusting device in which frequent switching between the active and passive modes is prevented by imparting a hysteresis characteristic to the selecting operation from the first distance measuring circuit of the active type to the second distance measuring circuit of the passive type and from the second distance measuring circuit of the passive type to the first distance measuring circuit of the active type.

BRIEF DESCRIPTION OF THE DRAWINGS

FIG. 2 is a graph illustrating variations of the ranges of object distances to which the two range finders are responsive with the reflectivity of the object.

FIG. 3(a) is a graph illustrating the relationship of the object distance and the received light signal level.

FIG. 3(b) is a diagram illustrating the relationship of the received light signal level and the hysteresis characteristic.

DETAILED DESCRIPTION OF THE PREFERRED EMBODIMENTS

Figure 1:
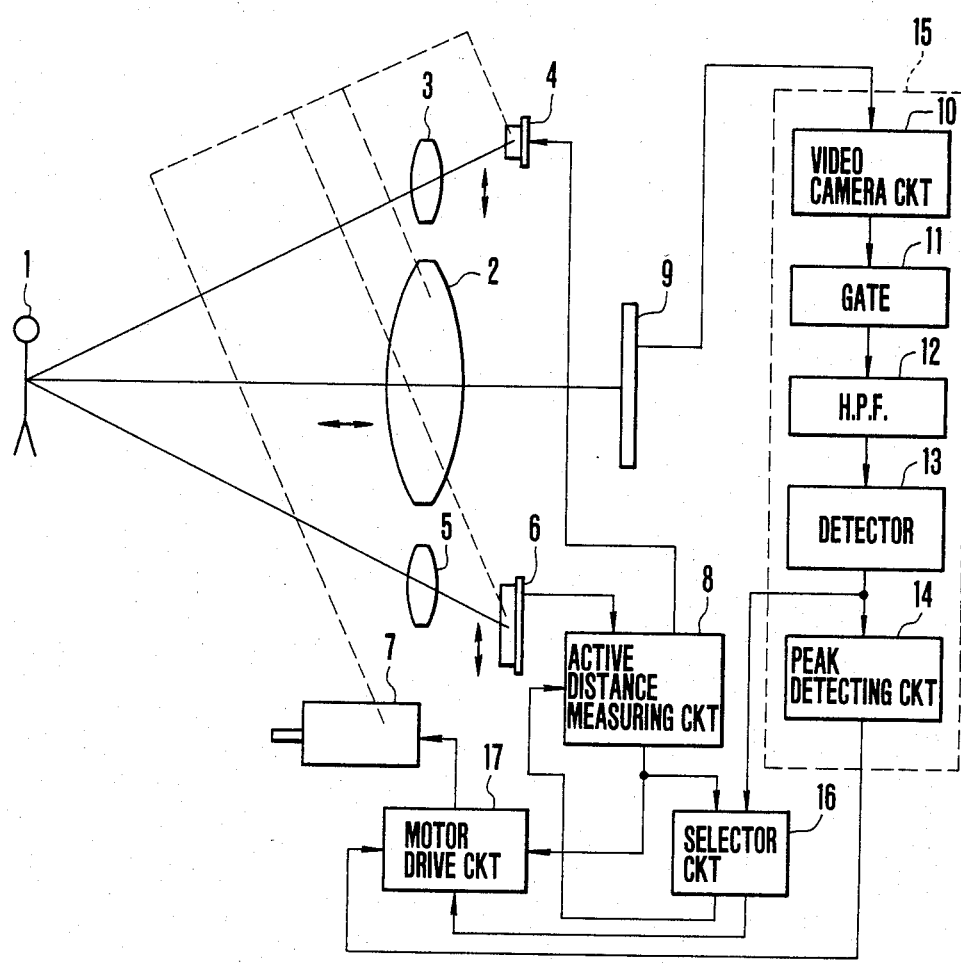
FIG. 1 is a partly schematic partly block diagram of an embodiment of the automatic focus adjusting device according to the present invention.

FIG. 1 illustrates an embodiment of the present invention and shows an object 1 to be photographed; a photographic lens 2; a projection lens 3; a light source 4; a collection lens 5; a photo-sensitive element 6; an electric motor 7; an activetype distance measuring circuit 8; an image pickup element 9; a video camera circuit 10; a gate 11; a high pass filter 12; a detector 13; a peak detecting circuit 14; a passive type distance measuring circuit 15; and a selector circuit 16.

A so-called active difference type of distance measuring device having one light source and a two-area light receiving element as, for example, described in detail in Japanese Patent Publication No. SHO 54-9054, may be used as the first distance measuring device of the active type. A so-called mountain climbing control type distance measuring device in which the degree of image sharpness is measured by using the high band component of the video signals of the video camera, and the photographic lens is adjusted so that the degree of image sharpness becomes maximum, may be used as the second distance measuring device of the passive type. A document entitled "Automatic Focus Adjustment of a Television Camera by the Mountain Climing Servo Method" in NHK Technical Report SHO 40(1965) Vol. 17, No. 1, (Whole Number 86) describes this passive type of device.

FIG. 2 illustrates the relationship of the object conditions and alloted regions to the two distance measuring devices. FIG. 3 illustrates the relationship of the object distance to the received light signal level, to the hysteresis. FIGS. 4 to 7 explain the selecting circuit.

In the first distance measuring circuit of the active type of FIG. 1, light from the light source 4 is projected by the lens 3 onto an object 1 to be photographed, and a light source image is formed on the object. As light radiates from the image by diffusing reflection, its path is focused by the collection lens 5 on the light receiving element 6. Light receiving element 6 has two sensors of two picture elements positioned adjacent to each other. The light source 4 and the light receiving element 6 change their positions as indicated by respective arrows in response to axial movement of the photographic lens 2 driven by the motor 7, measuring the object distance on the principle of trigonometrical survey. In this case, the target area always lies on the optical axis of the photographic lens 2, when in focus permitting a parallax free distance measuring. The active distance measuring circuit 8 constitutes part of a servo system so that the center of the light source image on the light receiving element comes on in the boundary line between the two sensors of the picture elements.

The passive distance measuring circuit 15 will now be described. The image pickup element 9 produces photo signals which are then converted to video signals by the video camera circuit 10 in, for example, an NTSC system. Of these signals, only those which represent the same field of view as that for the active distance measuring circuit 8 are taken up by the gate 11. A high pass component is extracted from the output of gate 11 by a high pass filter 12 and is applied through the detector 13 to the peak detecting circuit 14. The photographic lens 2 is controlled by the motor 7 so that the high pass component becomes the maximum sensed by the peak detecting circuit 14. Further, the output of the detector 13 is applied to the selector circuit 16 for the purpose of changing over between the two distance measuring circuits, as will be described later. Element 17 is a motor drive circuit. The selector circuit for selecting either one of the two distance measuring circuits to move the motor 7 will now be described. The possible active distance measuring range expressed with the reflectivity of the object and the object distance as parameters is zone A in FIG. 2. According to the prior art, for an object in zone B, indiscriminately, the photographic lens is set at the hyperfocal distance or at infinity. In the present invention, however, the zone B is used by the passive distance measuring circuit in controlling the photographic lens. A zone C is formed to have a hysteresis to be described later.

Given the condition that the reflectivity is 50%, as shown by a dashed line in FIG. 2, and taking the object distance as a variable on the abscissa of FIG. 3(a), the light signal level received by the light receiving element 6 is determined as shown on the ordinate. VL is a value of the received light signal for an object at a distance corresponding to the boundary between the zones B and C of FIG. 2, VN is a value of the received light signal for the boundary between the zones A and C, and VM is an intermediate value between the values VL and VN. When the same object distance is measured by the two range finders of different type, because of the difference of their principles of distance measurement, it is usual that the distance measuring results differ slightly from each other. Also, the signal for changing over between the two modes, or the received light signal level itself, varies with time to a minute extent due to ambient light noise and electrical noise migrated into the circuit. As a result, when changing over between the active and passive modes is performed, the motor control signal becomes unstable, causing the photographic lens to hunt or to jerk back and forth.

To stabilize the operation of the photographic lens against such improper actions, it is effective to condition the changing over of the two distance measuring modes to have a hysteresis. Referring to FIG. 2, assuming that the object is in the zone A, and the active distance measuring circuit is selectively operating, when the received light signal level then drops, as the level exceeds the value VL, changing over to the passive distance measuring circuit takes place. Alternatively, assuming that the object is in the zone B, and the passive distance measuring circuit is selectively operating, when the received light signal level then rises, as the level exceeds the value VN, the distance measuring operation changes over to the active mode. By the way, as the zone B comes to action, even after the passive distance measuring circuit is selected to operate, the active distance measuring circuit itself is necessarily left to operate as a monitor for the received light signal level. But, for the monitoring purpose, the energization of the light source 4 may be intermittent, thereby minimizing the amount of electrical energy consumed.

FIG. 3(b) illustrates which of the distance measuring circuits is selected to operate as an object having 50% reflectivity moves from 1 meter to infinity. With the object at 1 meter, the active distance measuring circuit is selected. As the object moves to infinity, the received light signal level descreases in proportion to the square of the object distance. For a certain distance, namely, the boundary distance between the zones B and C of FIG. 2, the received light signal level exceeds the value VL. Responsive to this, the selector circuit 16 renders the passive distance measuring circuit 15 operative, thereby controlling the motor 7 by its output. After that, during the time when the object moves to an infinite distance, the passive distance measuring circuit continues being selected. Conversely, when the object moves from infinity to the minimum, the received light signal level gradually increases. For another certain distance, namely, the boundary distance between the zones A and C of FIG. 2, changing over to the active distance measuring circuit takes place. After that, until the distance of 1 meter, this circuit continues being selected.

Figure 4:
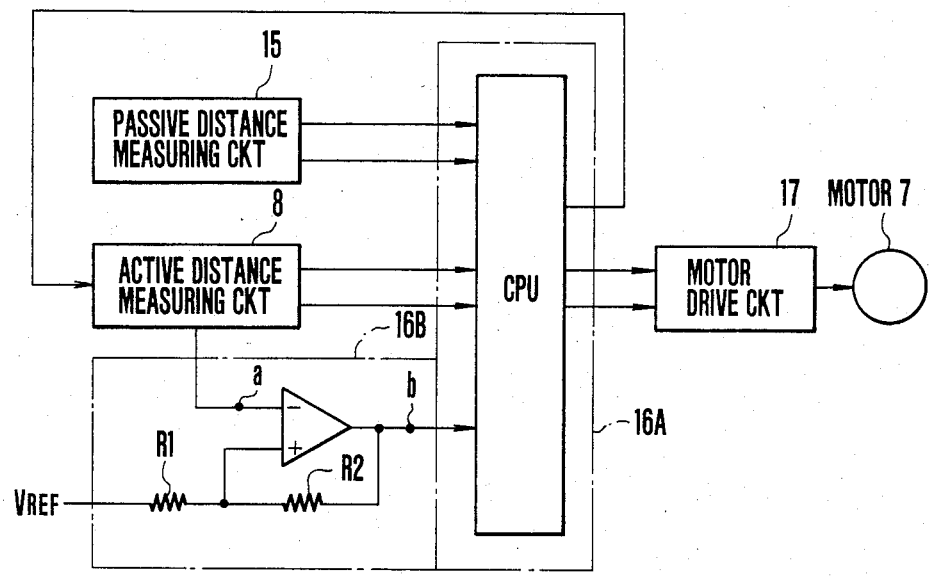
FIG. 4 is a block diagram of a selector circuit.

FIGS. 4 to 7 illustrate the details of the selector circuit 16 of FIG. 1. In FIG. 4, a block enclosed by dot-and-dash lines represents a selector circuit comprising a central processing unit (CPU: microprocessor) 16A and a comparator 16B.

The central processing unit 16A receives the signals from the first distance measuring circuit 8 of the active distance measuring method, the second distance measuring circuit 15 of the passive distance measuring method and the comparator 16B having a hysteresis characteristic to be described later and selects either one of the active distance measuring circuit 8 and the passive distance measuring circuit 15 for application to the motor drive circuit 17 depending on the object conditions.

Figure 6:
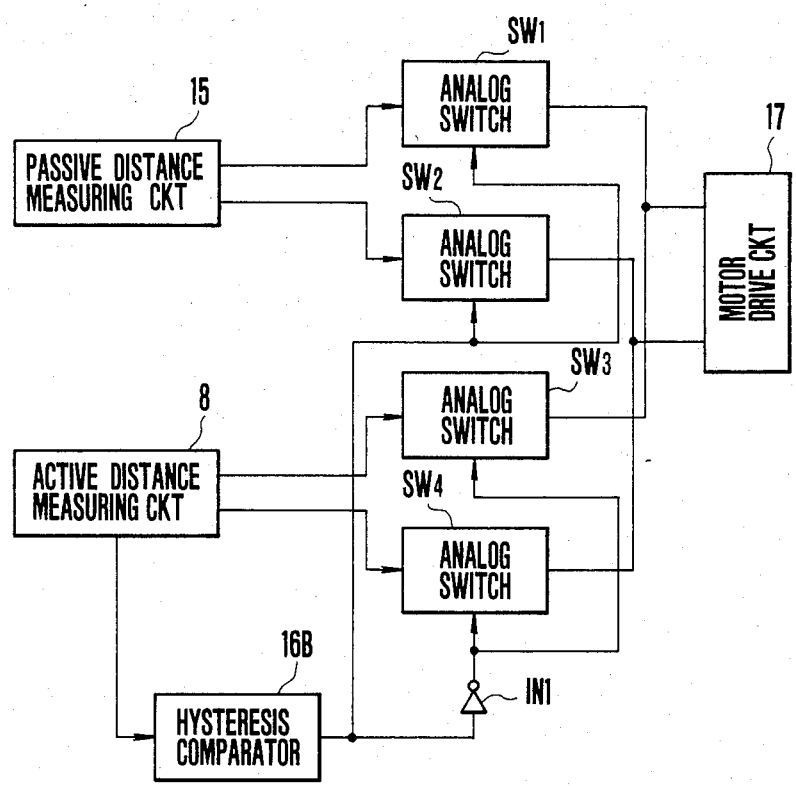
FIGS. 6 and 7 are diagrams illustrating the construction of a selector circuit.

FIG. 6 illustrates an example in which the central processing unit 16A of FIG. 4 is replaced by four analog switches SW1 to SW4 and an inverter IN1.

The operation of the circuit of FIGS. 4 and 6 will now be described Assume that the circuit is set up so that the output "b" of the comparator 16B becomes a logic signal "0" when the received light signal level Vi of the active distance measuring circuit 8 is larger than the level VN shown in FIG. 3. The output 37 0" of the comparator 16B is applied through the inverter IN1 to the switches SW3 and SW4, and the output "0" is directly applied to the switches SW1 and SW2. Therefore, in the circuit 16A, the analog switches SW1 and SW2 are rendered non-conducting so that the signal from the passive distance measuring circuit 15 is not placed on the output line. Only the output signal of the active distance measuring circuit 8 is applied through the switches SW3 and SW4 to the motor drive circuit 17, and the motors rotates. When the received light signal level Vi is smaller than the level VL, the output "b" of the comparator 16B becomes the logic signal "1". Therefore, the motor drive circuit 17 operates by the signal of the passive distance measuring circuit 15.

Figure 5:
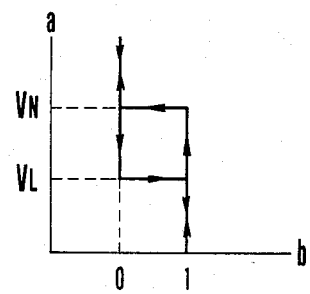
FIG. 5 is a graph illustrating the relationship of the output signal of the active distance measuring circuit and the output of a hysteresis comparator.

The hysteresis characteristic of FIG. 5 will now be described. When the selector circuit responsive to the object condition selects the active distance measuring circuit 8, as the object distance changes with change of the received light signal level along the curve of FIG. 3(a), the received light signal passes over a point "x" and reaches a point "y" where Vi=Vl or Vi<VL and the comparator 16B then changes its output from "0" to "1".

Where the selector circuit selects the passive distance measuring circuit 15, as the received light signal Vi increases past the point "y" at which the active distance measuring circuit was exchanged by the passive distance measuring circuit and the point "x" where Vi=VN or Vi>VN is reached, the comparator 16B of FIG. 4 then changes its output "b" from "1" to "0".

As will be understood from the foregoing, the feature of the invention is that when changing over between the active distance measuring circuit and the passive distance measuring circuit, a prescribed certain changing over width is had so that when the received light signal Vi decreases, the point at which the active is exchanged by the passive is the point "y" (Vi≦VL), and when in the opposite direction, the point at which the passive is exchanged by the active is the point "x" (Vi≧VN).

A so-called hysteresis phenomenon is thus provided.

As the comparator 16B having this hysteresis characteristic a circuit described in the journal "Electronics" issued May 10, 1973 may be used.

Figure 7:
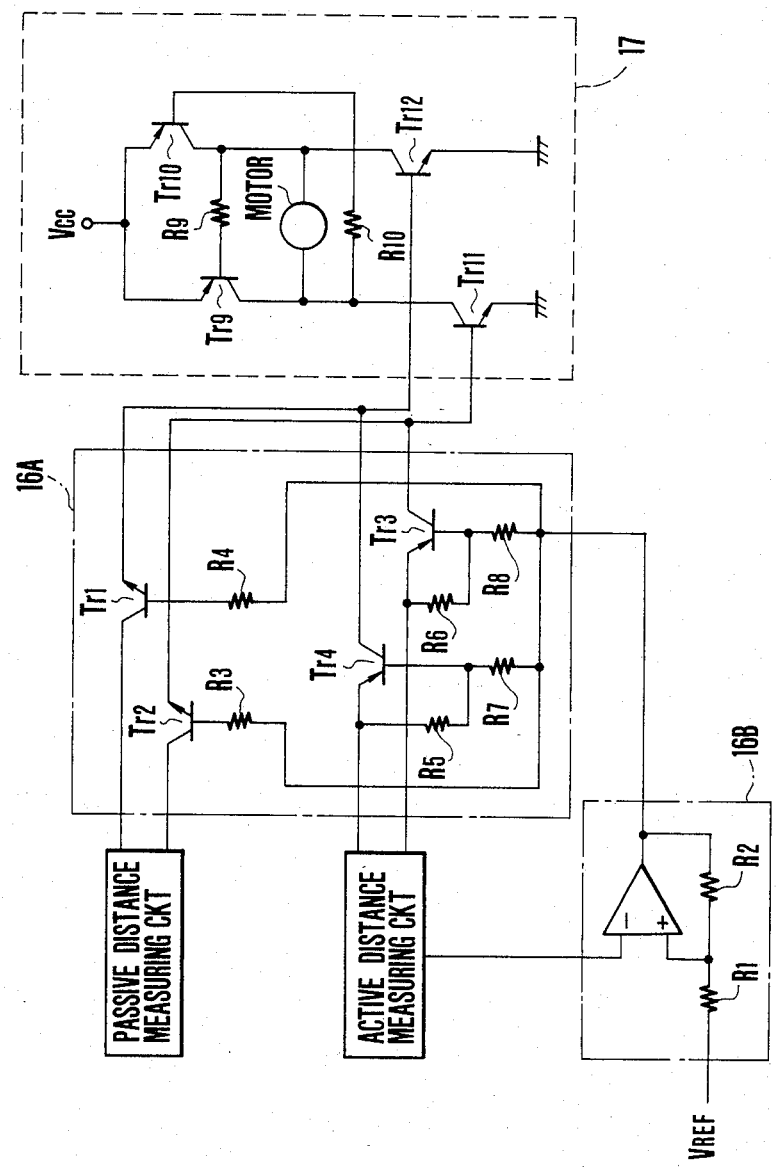

FIG. 7 illustrates a concrete circuit construction of the analog switches SW1–SW4 using transistors Tr1 to Tr4 and resistors R3 to R8.

Transistors TR9 to Tr12 and resistors R9 and R10 constitute a motor drive circuit 17.

Thus, the embodiment of the present invention performs the changing over with an emphasis on the active type, and, therefore, realizes a hybrid type of high reliability.

Further, various conditions can be used as the changing over condition the two distance measuring circuits, besides the above-described received light signal level.

Figure 8:
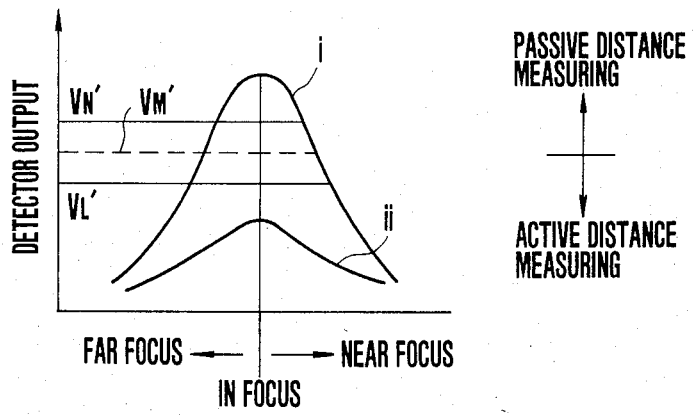
FIG. 8 is a graph illustrating a manner in which another embodiment of the invention operates.

For example, as shown in FIG. 8, it is possible to utilize the output of the detector 13.

FIG. 8 is a graph in which the ordinate shows the output of the detector for the object, and the abscissa the out-of-focus degree of the photographic lens. A curve labelled "i" corresponds to a condition where the brightness and contrast of the object are high, and another curve labelled "ii" to a condition where (1) the contrast is low, or (2) the brightness is low. First, considering curve "ii", although it is also possible to increase the circuit gain with a forced heightening of the output of the detector so that the distance measuring is performed in the passive type mode, the motor control is difficult to stabilize because the signal has a poor S/N.

Therefore, in this region, unconditionally, the distance measuring is performed by the active type.

For the curve "i", because the S/N of the detector output is high, the distance measuring may be performed by the hybrid type. That is, as largely unfocused, when the detector output is smaller than a level VN', the photographic lens is controlled by the active distance measuring circuit. At a point where the detector output exceeds the level VN', the passive distance measuring circuit is selected to operate and the photographic lens is controlled to come to an in-focus state.

Next, as the object condition changes, or as suddenly largely defocused, when the detector output becomes smaller than a level VL', the active distance measuring circuit is selected to again operate and the motor is controlled by its output. A selector circuit may be similar in construction to that shown in connection with the first embodiment.

In the case of this embodiment, passive distance measuring is performed only when the object brightness is so high and contrast is so high as to be advantageous to the passive distance measuring. Therefore, as a whole, a distance measuring system of low energy consumption and high reliability is realized.

As has been described above, using the hydrid type with automatic changeover, a system of high accuracy of distance measurement and high reliability can be constructed.

What is claimed is:

1. An automatic focus adjusting device comprising:
   (a) a focusing lens;
   (b) lens drive means for moving said focusing lens;
   (c) first distance measuring means including light emitting means for producing a distance measuring light on an object to be photographed, and light receiving means receptive of a reflection of said distance measuring light from the object for producing a received light signal corresponding to amount of reflected light;
   (d) second distance measuring means including a detector receptive of reflection of natural light or indoor light from the object for detecting and generating an output of the distance of said focusing lens from an in-focus position, or an out-of-focus amount; and
   (e) selecting means for receiving said received light signal and the output of said detector and selecting operation of said first or second distance measuring means on the basis of either one of said signals.

2. An automatic focus adjusting device comprising:
   (a) a focusing lens;
   (b) lens drive means for controlling said focusing lens;
   (c) first distance measuring means of the active type for emitting a distance measuring light to an object to be photographed and for controlling said lens drive means in response to a received light signal from a light receiving means;
   (d) second distance measuring means of the passive type for controlling said lens drive means in response to a signal based on a reflection of natural light or indoor light from the object; and
   (e) means, responsive to the signal of said first or said second distance measuring means, for selecting the control of said lens drive means by the signal of either one of said first and second distance measuring means;
   said selecting means having means for further continuing the control of a selected distance measuring means when changing over between said first and second distance measuring means until said received light signal exceeds a prescribed range of values.

* * * * *